(12) United States Patent
Ueyama (10) Patent No.: US 6,549,244 B1
(45) Date of Patent: Apr. 15, 2003

(54) SCANNING SPEED MODULATING CIRCUIT FOR PICTURE DISPLAY

(75) Inventor: Akihiro Ueyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/529,288

(22) PCT Filed: Aug. 13, 1999

(86) PCT No.: PCT/JP99/04389

§ 371 (c)(1),
(2), (4) Date: Mar. 28, 2000

(87) PCT Pub. No.: WO00/10324

PCT Pub. Date: Feb. 24, 2000

(30) Foreign Application Priority Data

Aug. 14, 1998 (JP) ............................................. 10-229746

(51) Int. Cl.[7] .................................................. H04N 5/21
(52) U.S. Cl. ....................................................... 348/626
(58) Field of Search ................................ 348/626, 625, 348/629; 315/371, 391, 394, 395; H04N 5/21

(56) References Cited

U.S. PATENT DOCUMENTS

| 5,164,829 | A | * | 11/1992 | Wada | 348/625 |
| 5,449,982 | A | * | 9/1995 | Ando | 315/371 |
| 5,587,745 | A | * | 12/1996 | Griepentrog et al. | 348/625 |
| 5,784,106 | A | * | 7/1998 | Sluyterman | 315/386 |

FOREIGN PATENT DOCUMENTS

| EP | 0689347 | 12/1995 | ............ H04N/3/32 |
| JP | 02013362 | 1/1990 | |
| JP | 03184479 | 8/1991 | |
| JP | 05244449 | 9/1993 | |
| JP | 05085163 | 11/1993 | |
| JP | 07015618 | 1/1995 | |
| JP | 08251439 | 9/1996 | |
| JP | 10032728 | 2/1998 | |
| JP | 10042162 | 2/1998 | |
| JP | 10065933 A | * 3/1998 | ............ H04N/3/32 |

* cited by examiner

Primary Examiner—Michael H. Lee
(74) Attorney, Agent, or Firm—Jay H. Maioli (57) ABSTRACT

In an image output apparatus such as a television receiver or the like, a speed modulating circuit for modulating a scanning speed of an electron beam and emphasizing an outline of an image is provided. Reference numeral 10 denotes a video amplifying unit for amplifying a video signal which is inputted by a baseband and driving a cathode ray tube; 11 a differentiating circuit for detecting a change point of the video signal. A detected signal is adjusted to a predetermined level by a next waveform shaping circuit 12 and further supplied through a variable gain amplifier 13, a signal synchronizing circuit 14, and an output amplifier 15 to a scanning speed modulating coil 5 provided in a neck portion of the CRT. Reference numeral 16 denotes a waveform generating circuit for generating a parabolic signal to varying a modulation degree when the speed modulation is performed synchronously with a horizontal period; 17 a sampling circuit for detecting, particularly, an average level of a luminance signal of peripheral portions of an image; and 18 a maximum value detecting circuit for comparing a level of the signal generated from the waveform generating circuit 16 with a level of a signal outputted from the sampling circuit 17 and outputting the signal of the higher level. A gain of the variable gain amplifier 13 is controlled by an output of the maximum value detecting circuit 18, thereby controlling a level of the speed modulation signal.

5 Claims, 8 Drawing Sheets

Fig. 2A VIDEO SIGNAL

Fig. 2B SPEED MODULATING COIL CURRENT

Fig. 2C SYNTHETIC MAGNETIC FIELD

Fig. 2D BEAM SPEED

Fig. 2E LUMINANCE

SCANNING SPEED MODULATING CIRCUIT FOR PICTURE DISPLAY

TECHNICAL FIELD

The invention relates to a scanning speed modulating (VM) circuit which is used to improve sharpness of a display image in an image display apparatus using a cathode ray tube (CRT) such as television receiver, video monitor, or the like and, more particularly, to a scanning speed modulating circuit which is useful when a peripheral image is sharpened in an image display apparatus using a cathode ray tube whose display screen is flat.

BACKGROUND ART

In an image display apparatus using a cathode ray tube such as television receiver, video monitor, or the like, there is a case where a scanning speed modulating circuit is used to sharpen a display image. According to the scanning speed modulating circuit, a steep change point of a video signal is detected and a scanning speed of an electron beam of the cathode ray tube is modulated at the change point, thereby emphasizing dark/light states of an outline portion of the image and enabling the image to be sharply seen.

Figure 1:
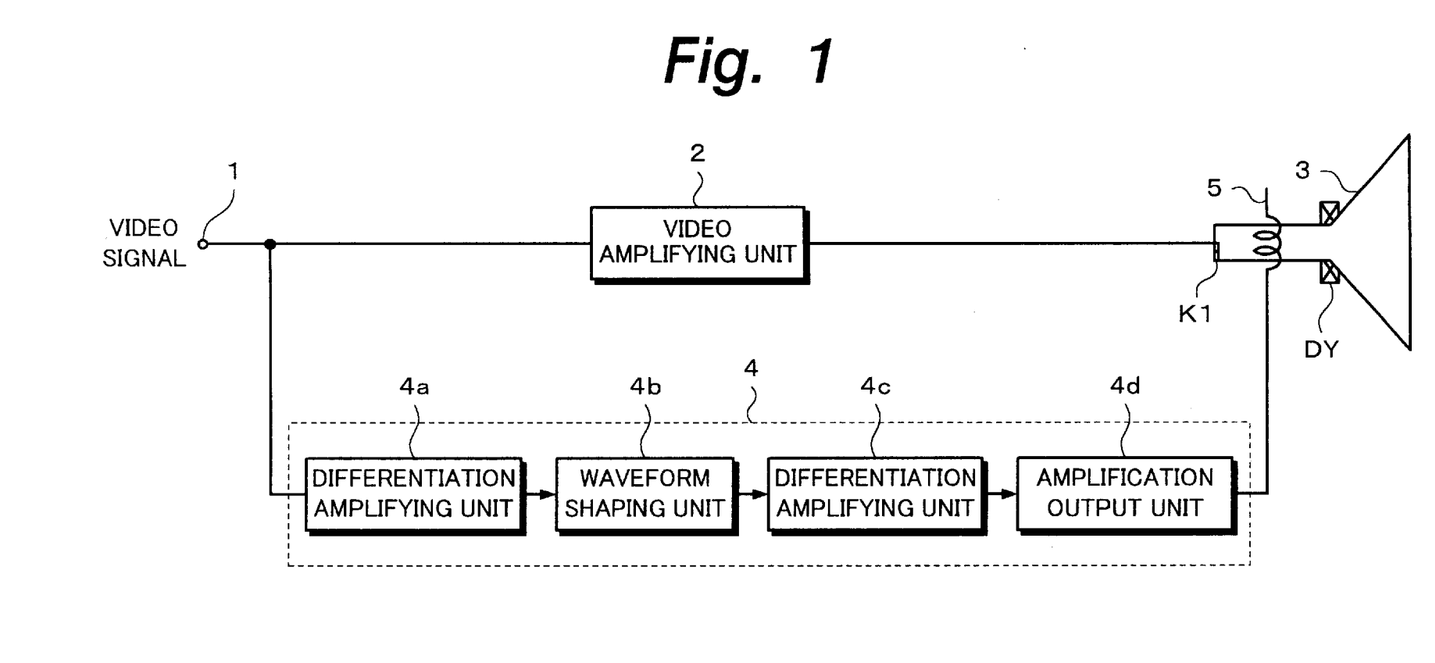
FIG. 1 is a block diagram for explaining a conventional scanning speed modulating circuit.

FIG. 1 shows a conventional example of a scanning speed modulating circuit for modulating a beam scanning speed of such a cathode ray tube and correcting an outline. Reference numeral 1 denotes a video signal terminal; 2 a video amplifying unit; and 3 a cathode ray tube (CRT) to which an electron beam is scanned by a deflecting coil DY.

Reference numeral 4 denotes a scanning speed modulating circuit unit comprising: a differentiating circuit 4a for detecting a change point of a video signal; a waveform shaping circuit 4b for shaping a differentiating waveform; a differentiating amplifier 4c; and an amplification output unit 4d. An output of the amplification output unit 4d is supplied to a scanning speed modulating coil 5 attached to a neck portion of the CRT 3. A video signal from the video amplifying unit 2 is supplied to a cathode K1 of the CRT 3.

Figures 2A, 2B:
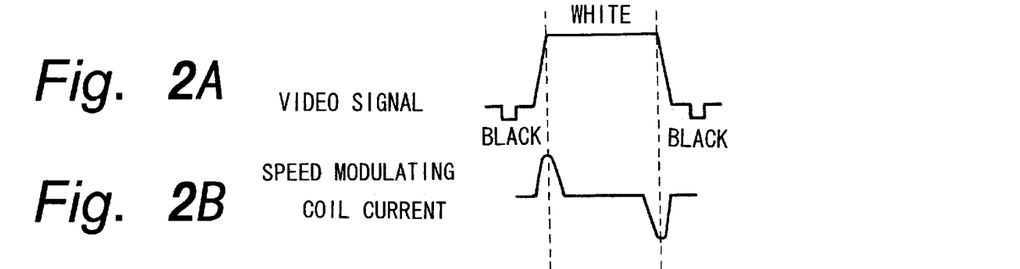
FIG. 2 is a waveform diagram for explaining the sharpening operation of an image by a speed modulation.
Figures 2C, 2D, 2E:
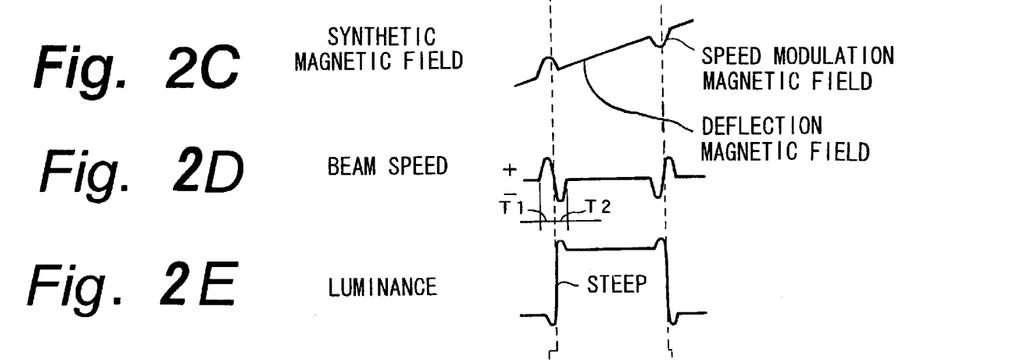

In a television receiver having such a scanning speed modulating circuit, for example, when a video signal as shown in FIG. 2A corresponding to an image comprising a white portion and a black portion is supplied, a current of a signal waveform differentiated at a change point of the video signal as shown in FIG. 2B can be supplied to the speed modulating coil 5. Thus, an intensity of a synthetic magnetic field of the deflecting coil DY for scanning an electron beam in the horizontal direction and the scanning speed modulating coil 5 changes as shown in FIG. 2C. A moving speed of the electron beam is subjected to a speed modulation such that it is accelerated in the + side direction for a usual horizontal scanning speed and soon decelerated in the − side direction as shown in FIG. 2D.

Figure 2F:
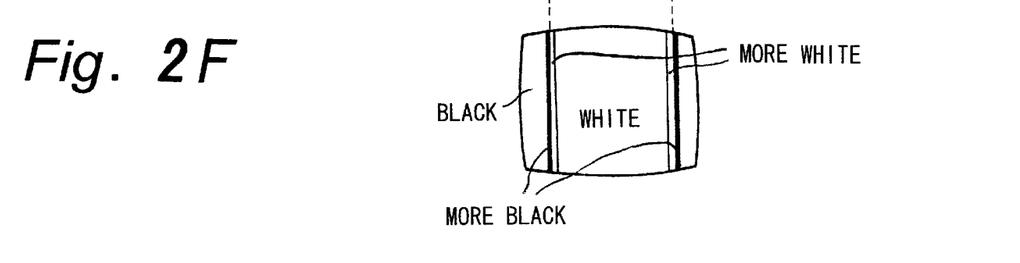

Thus, a luminance of an image which is displayed on the CRT 3 changes so as to become blacker at a point where the speed rises and become whiter at a point where the speed decreases as shown in FIG. 2E. As shown in FIG. 2F, a portion just before a vertical line which rises from black to white is displayed blacker and a portion just after the rising is displayed whiter, thereby enabling an outline portion of the image to be sharply seen.

However, even when the speed modulation as mentioned above is performed, there is a case where the sharpness cannot be sufficiently improved with respect to a peripheral image. The reasons of it will now be described hereinbelow.

A raster of a cathode ray tube is formed by scanning the electron beam emitted from the cathode K1 of the CRT 3 onto a fluorescent surface of the CRT. In this instance, the nearer a scanning position approaches a peripheral portion of the raster, the longer a flying distance of the electron beam is, so that a deflecting sensitivity of the peripheral portion of the raster is higher than that of the center portion of the raster. Therefore, a phenomenon such that the image of the peripheral portion of the raster is extended in the scanning direction as compared with the image of the center portion of the raster occurs.

To prevent such a phenomenon, a correction called an S-character correction such that an inclination near the scan start portion and an inclination near the scan end portion of a scanning signal having a saw-tooth-shaped waveform are made gentler as compared with an inclination of the center portion, thereby making the deflecting sensitivity of the peripheral portion.of the raster and that of the center portion identical is performed.

The deflecting sensitivity regarding the speed modulation will now be considered. By reasons similar to those mentioned above, a deflecting sensitivity due to a deflecting magnetic field generated by the scanning speed modulating current as shown in FIG. 2B also rises in the peripheral portion of the raster of the CRT. Therefore, if a level of a speed modulation signal is set so as to obtain a proper sharpness in the center portion of the raster, the speed modulation is excessively performed in the peripheral portion of the raster, so that a problem of deterioration of the sharpness contrarily occurs. Particularly, in the peripheral portion of the raster, since the electron beam enters a normal of the fluorescent surface at an angle of inclination, a focusing deterioration easily occurs, so that the deterioration of the sharpness in the peripheral portion of the raster becomes typical. Further, when the display screen of the CRT is flat, in the peripheral portion of the raster, since the electron beam enters the normal of the fluorescent surface at a larger inclination angle, the deterioration of the sharpness becomes more remarkable.

To solve such a problem, a technique such that the level of the speed modulation signal in a scanning region of the peripheral portion of the raster where the deflecting sensitivity is high is reduced to thereby decrease an outline correction amount has been proposed in, for example, JP-A-5-244449.

In the prior art disclosed in the above Official Gazette, a correction signal is modulated in a parabolic shape so that a correction amount of the speed modulation in the center portion of the raster is smaller than that of the peripheral portion of the raster.

However, if the correction amount of the speed modulation is merely changed in the parabolic shape as shown in the prior art disclosed in the above Official Gazette, problems as will be explained hereinbelow remain.

The focusing deterioration in the CRT does not continuously occur from the center portion of the raster toward the peripheral portion of the raster but tends to suddenly occur in the peripheral portion near the outer edge of the raster. In most of the regions of the raster, a good focus is obtained. Therefore, it is desirable to improve the sharpness of the image by performing a speed modulation to most of the regions of the raster.

However, in the prior art disclosed in the above Official Gazette, since the correction amount of the speed modulation is merely sequentially reduced along the parabolic waveform from the center portion of the raster toward the peripheral portion of the raster, if the correction amount of the speed modulation is set so that a proper speed modulation is performed in the center portion of the screen, the correction amount is insufficient in a region near the peripheral portion of the raster. Therefore, there is a problem such that the sharpness of the image cannot be sufficiently improved in a region near the peripheral portion of the raster.

Although the deflecting sensitivity increases almost in proportion to a tangent function and the focusing deterioration also corresponds to it, since the correction amount of the speed modulation is changed along the parabolic waveform in the prior art disclosed in the above Official Gazette, there is a problem such that the change of the correction amount of the speed modulation of the amount necessary to eliminate the focusing deterioration and the change of the correction amount of the speed modulation which is actually supplied do not correspond to each other and the optimum correction cannot be performed.

When an influence that the speed modulation exerts on a picture quality of the image is now examined, a phenomenon such that when the speed modulation is strongly performed, generally, a vertical white line becomes thinner than the inherent width and a black line becomes thicker exists. For example, in the case where a black character exists in the image, the black character becomes thick by performing the speed modulation and, in the case where a white character exists in the image, the black character becomes thin by performing the speed modulation.

Although the focusing deterioration occurs in the peripheral portion of the screen as mentioned above, when the thickening of the black character in the peripheral portion of the screen is compared with the focusing deterioration in the peripheral portion of the screen, the deterioration of the picture quality due to the focusing deterioration becomes a problem. Therefore, when a character existing in the peripheral portion of the screen is a black character, even if the thickening of the black character occurs, it is desirable to improve the picture quality by performing the speed modulation.

However, in the prior art disclosed in JP-A-5-244449, since the correction amount of the speed modulation is sequentially reduced along the parabolic waveform from the center portion of the raster toward the peripheral portion of the raster, the correction amount of the speed modulation for the peripheral portion of the screen decreases and the deterioration of the picture quality in the peripheral portion of the screen cannot be prevented. When the correction amount of the speed modulation for the peripheral portion of the screen is increased, if a white character exists in the peripheral portion of the screen, a problem of the occurrence of a blur of the white character occurs.

It is, therefore, an object of the invention to provide a scanning speed modulating circuit of an image display apparatus which can properly prevent a deterioration of a picture quality in a peripheral portion of a screen.

Another object of the invention is to provide a scanning speed modulating circuit of an image display apparatus which can perform a speed modulation by an enough correction amount even in a region near a peripheral portion of a screen and can obtain an image whose picture quality is improved in most of regions of the screen.

Still another object of the invention is to provide a scanning speed modulating circuit of an image display apparatus which can improve a picture quality due to a speed modulation even in a peripheral portion of the screen.

DISCLOSURE OF INVENTION

To solve the above problems, according to the invention, there is provided a scanning speed modulating circuit of an image display apparatus, in which by modulating a scanning speed of an electron beam of a cathode ray tube in accordance with a video signal that is supplied to the cathode ray tube, sharpness of an image which is displayed on the cathode ray tube is improved, comprising:

correction signal generating means for generating a speed modulating correction signal to modulate the scanning speed of the electron beam on the basis of the video signal;

correction signal control means for controlling a level of the speed modulating correction signal by a reference signal having a predetermined waveform that is changed synchronously with a scan of the electron beam; and reference signal generating means for generating a signal, as a reference signal, of a waveform such that it decreases along a curve that is analogous to a deflecting sensitivity of the cathode ray tube in a peripheral portion of a screen of the cathode ray tube.

The correction signal generating means can generate the reference signal of the waveform such that it decreases along a curve which is almost flat in a center portion of the screen of the cathode ray tube and whose both ends are analogous to the deflecting sensitivity.

The reference signal generating means can include: a square circuit which inputs a saw-tooth wave signal synchronized with the scan of the electron beam; and a limiter for limiting a level of an output of the square circuit.

The square circuit can be constructed by a variable gain multiplying circuit whose two input terminals are connected in common.

The scanning speed modulating circuit further comprises: detecting means for detecting a level according to an average luminance of the video signal in portions corresponding to at least right and left peripheral portions of the screen of the cathode ray tube; and maximum value detecting means for comparing the level detected by the detecting means with a level of the reference signal generated by the reference signal generating means and supplying the signal of the higher level to the correction signal control means.

According to the invention, the correction signal generating means generates the reference signal of a waveform such that it decreases along a curve which is almost flat in the center portion of the screen of the cathode ray tube and in which, in portions on the outside from almost 60° as a deflection angle of the cathode ray tube, both ends are analogous to the deflecting sensitivity.

As mentioned above, according to the invention, since the signal of the waveform such that it decreases along a curve that is analogous to the deflecting sensitivity of the cathode ray tube in the peripheral portion of the screen of the cathode ray tube is used as a reference signal to perform the speed modulation, a blur of a thin white vertical line in the peripheral portion of the screen which is caused by the scanning speed modulation, particularly, the deterioration of a fine white character can be prevented.

According to the invention, since the speed modulation is performed on the basis of the reference signal of the waveform such that it decreases along the curve which is almost flat in the center portion of the screen of the cathode ray tube and whose both ends are analogous to the deflecting sensitivity, the speed modulation can be performed even in a region near the peripheral portion of the screen by the enough correction amount, and an image whose picture quality is improved in most of the regions of the screen can be obtained.

According to the invention, since the speed modulation in the peripheral portion of the screen can be selectively performed strongly or weakly in accordance with the average luminance of the video signal in the portions corresponding to the right and left peripheral portions, particularly, in the case where the average luminance is high because there is a black character or the like in the peripheral portion of the screen, its sharpness can be raised.

BEST MODE FOR CARRYING OUT THE INVENTION

Figure 3:
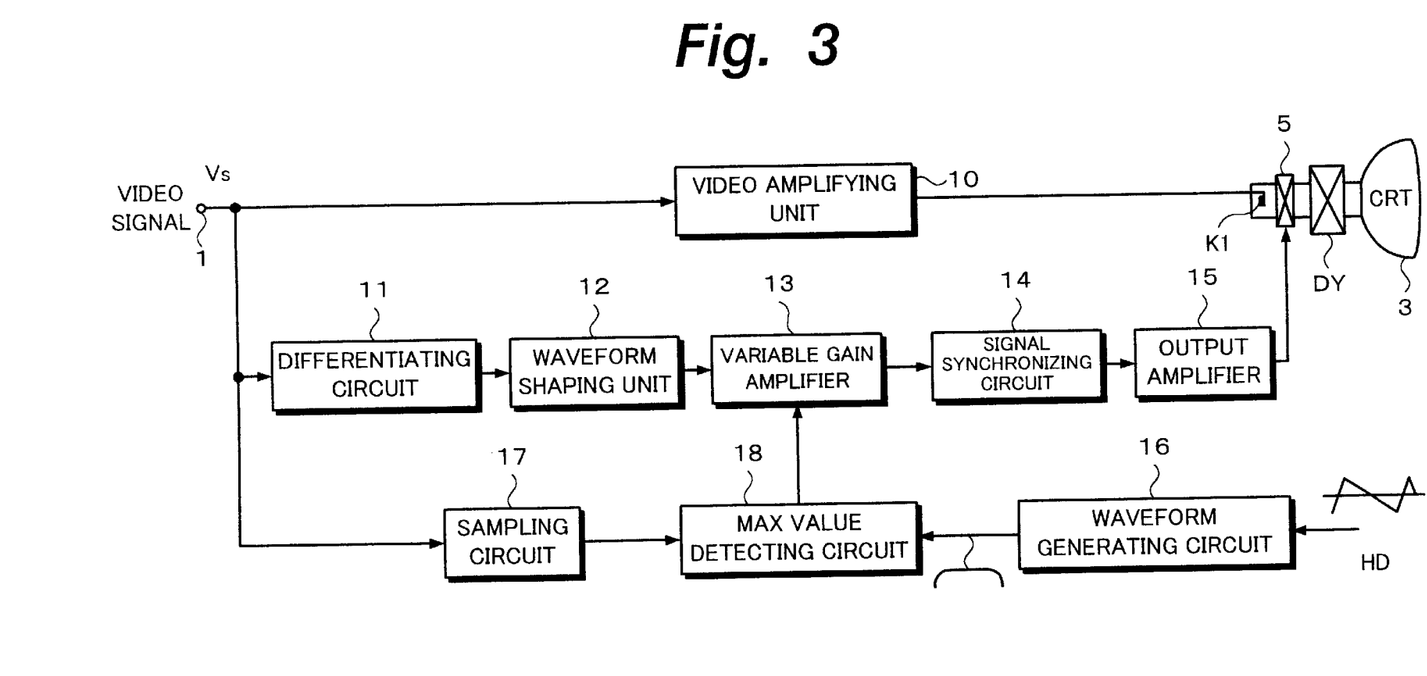
FIG. 3 is a block diagram showing an embodiment of the invention.

FIG. 3 is a block diagram showing a scanning speed modulating circuit of an embodiment of the invention.

In FIG. 3, reference numeral 10 denotes a video amplifying unit for amplifying a video signal Vs inputted by a baseband from the video signal terminal 1 and driving a cathode ray tube. Usually, the cathode electrode K1 of the cathode ray tube (CRT) 3 is driven and an electron beam is modulated.

Reference numeral 11 denotes a differentiating circuit for detecting a change point of the video signal as already mentioned in the term of Background Art. A signal detected by the differentiating circuit 11 is adjusted to a predetermined level by a next waveform shaping circuit 12 and further supplied through a variable gain amplifier 13, a signal synchronizing circuit 14, and an output amplifier 15 to the scanning speed modulating coil 5 provided in a neck portion of the CRT. The signal synchronizing circuit 14 is a circuit for performing a signal process to match a timing for performing the speed modulation with the video signal which passes through the video amplifying unit 10.

Reference numeral 16 denotes a waveform generating circuit for controlling a modulation degree of the speed modulation synchronously with a horizontal period in order to generate a parabolic signal whose center portion is deformed so as to become flat; 17 a sampling circuit for detecting, particularly, an average level of a luminance signal of peripheral portions of an image; and 18 a maximum value detecting circuit for comparing a level of the signal generated from the waveform generating circuit 16 with a level of a signal outputted from the sampling circuit 17 and outputting the signal of the higher level. A gain of the variable gain amplifier 13 is controlled by an output of the maximum value detecting circuit 18, thereby controlling the level of the speed modulation signal.

Figure 4A:
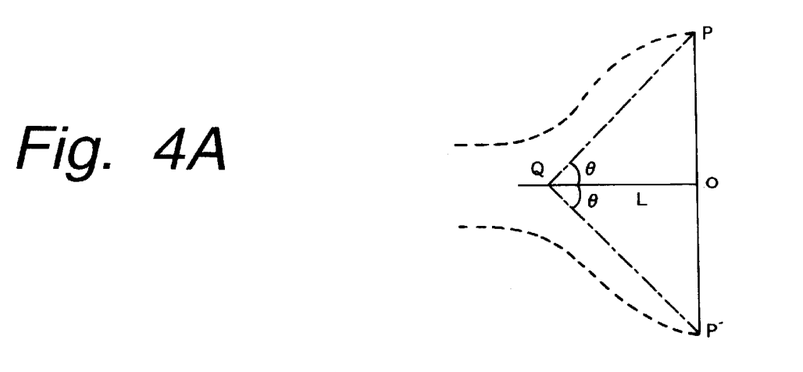
FIG. 4 is an explanatory diagram of a reference signal waveform which is used in the invention.

FIG. 4 is a diagram for explaining a waveform of the parabolic reference signal which is generated from the waveform generating circuit 16 and whose center portion has been deformed so as to become flat. FIG. 4A shows a tube surface of the CRT by p–p' by regarding it as a perfectly flat surface. Now, assuming that a deflection center of the electron beam is set to Q, an angle of the scanning beam is shown by θ.

Now, assuming that a distance from a center o of the screen to an arrival point p of the beam in the case where a deflection angle of the beam is equal to θ is labelled as "op" in the diagram, a deflecting sensitivity of the portion of the deflection angle θ is $$dop/d\theta = \{L \cdot \tan \theta\}/d\theta$$

Figure 4B:
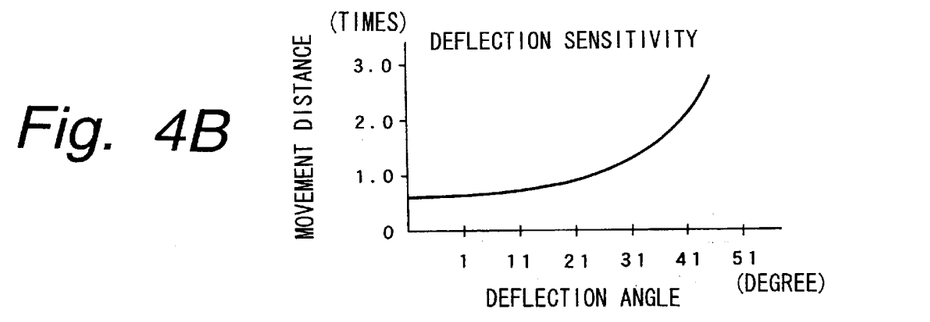

When a calculation result of the deflecting sensitivity mentioned above is shown by a diagram, it becomes a graph as shown in FIG. 4B. When the tube surface of the CRT is flat, the deflecting sensitivity does not largely change up to a deflection angle of 60° (in a range from +30° to −30° from the center).

In this range, therefore, the level of the correction signal of the speed modulation is set so that a proper correction is performed in a manner such that an extreme thickening operation of a black character or a too steep luminance change does not become unnatural.

Figure 4C:
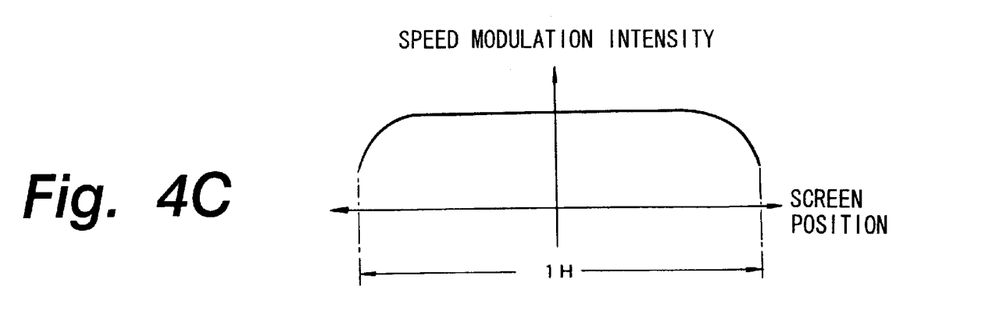

When a region where the beam is deflected by a deflection angle of 60° or more is now considered, the deflecting sensitivity suddenly increases in this region. In this range, as will be explained hereinbelow, for example, a signal of a waveform such that it decreases along a curve such that the center portion of the screen of the CRT is almost flat and both ends are analogous to the deflecting sensitivity is generated as shown in FIG. 4C so that a phenomenon of a blur of a white character due to an overcorrection does not occur, and this signal is used as a reference signal for speed modulation. A correction amount of the scanning speed modulation is controlled on the basis of the reference signal.

Figure 5A:
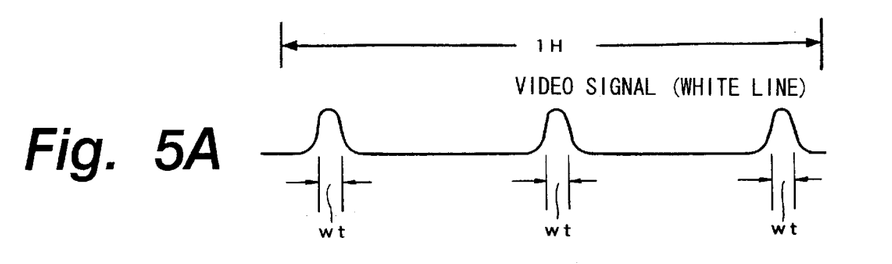
FIG. 5 is a waveform diagram for explaining a video signal in case of displaying a white line and a speed modulation signal corresponding to the video signal.
Figure 5B:
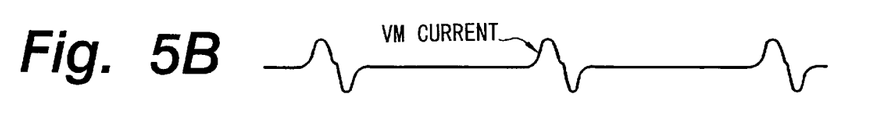
Figure 5C:
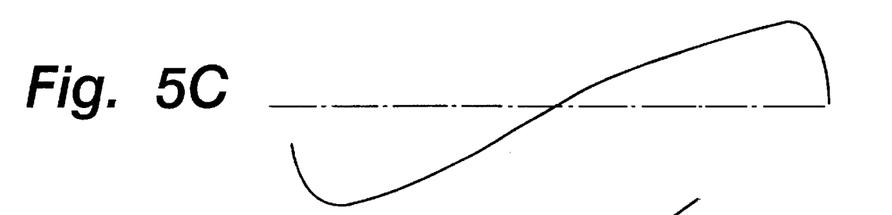

A relation between the position on the screen of the CRT and a change in correction amount of the scanning speed modulation will now be described with reference to FIG. 5. It is now assumed that white vertical lines extending vertically are displayed at the left edge, center, and right edge of the screen of the CRT, respectively. FIG. 5A shows a video signal corresponding to those three white vertical lines and a time width of the white vertical line is set to wt. A speed modulation (VM) current which is obtained by differentiating the video signal and performing a predetermined process is as shown in FIG. 5B. FIG. 5C shows a waveform of a horizontal deflection current. An S-character correction so as to reduce beam speeds at both ends of the screen as is well known has been performed to this waveform. The increase in deflecting sensitivity in the peripheral portion of the screen is corrected by reducing a current change value. Thus, the images on the right and left sides of the screen are prevented from being excessively extended, thereby enabling the electron beam to be scanned at a predetermined speed.

Figures 5D, 5E:
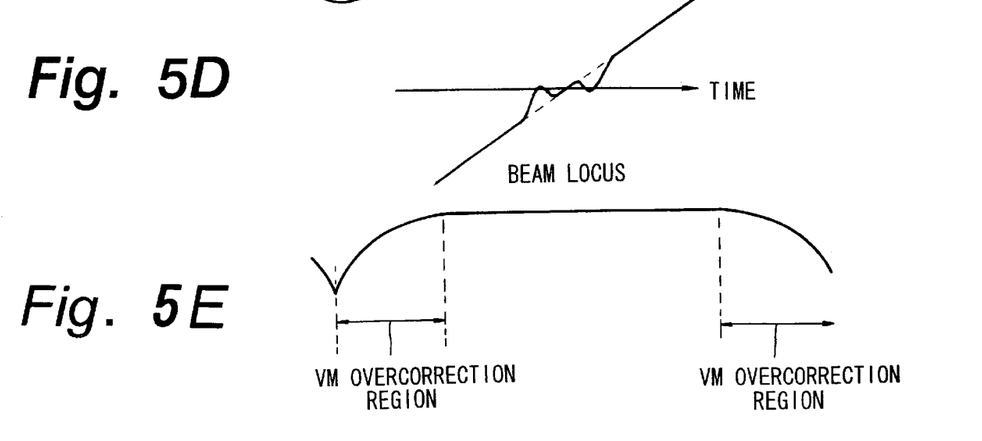

In this instance, if the speed modulation current as mentioned above is supplied by a predetermined correction amount irrespective of the scanning position of the CRT, since the correction of the deflecting sensitivity is not performed as for a magnetic field by the speed modulation current, the deflecting sensitivity with respect to the speed modulation is high in the peripheral portion of the screen. A phenomenon such that the electron beam is largely speed modulated in the peripheral portion of the screen occurs. FIG. 5D shows a motion of the electron beam, as a beam locus, by a magnetic field due to a speed modulation current at the position of the white vertical line on the screen. FIG. 5D is a diagram enlargedly showing a change in position of the electron beam at the position of the white vertical line. The upper side in the diagram corresponds to the right side of the tube surface of the CRT. As shown in FIG. 5D, in the former half of the white vertical line, after the electron beam was accelerated, it is decelerated and, in the latter half of the white vertical line, after the electron beam was decelerated, it is accelerated. In the accelerated portion, the white vertical line changes in the direction such that the luminance decreases, namely, in the black direction. In the decelerated portion, the white vertical line changes in the direction such that the luminance increases, namely, in the white direction, so that an outline of the white vertical line is emphasized. Therefore, if the correction amount of the speed modulation is proper, in case of displaying a white character constructed by thin lines, the sharpness of the white character is improved.

However, when the deflection angle exceeds 60° and the motion of the electron beam approaches the peripheral portion of the screen, generally, the deflecting sensitivity suddenly rises. Even if the correction amount of the speed modulation in the center portion of the screen is proper, the correction amount of the speed modulation in the peripheral portion of the screen becomes an overcorrection. A situation such that the electron beam which is usually always scanned in one direction partially and reversely moves as shown in FIG. 5D occurs.

When such a reverse motion of the electron beam occurs, the portion corresponding to the front edge of the white vertical line moves to the rear side rather than the portion corresponding to the inherent rear edge of the white vertical line, and the portion corresponding to the rear edge of the white vertical line moves to the front side rather than the portion corresponding to the inherent front edge of the white vertical line. Thus, the white line becomes thicker than the inherent thick size and the thin white character is blurred.

In the embodiment of the invention, therefore, the speed modulation correction amount is decreased along the curve of the deflecting sensitivity so that the reverse motion of the beam due to the overcorrection of the speed modulation does not occur.

That is, as shown in FIG. 5E, in a waveform showing the correction amount of the speed modulation, the portions corresponding to the overcorrection regions at both ends of the screen are set to a curve that is analogous to the deflecting sensitivity of the CRT. The position entering the overcorrection region, namely, the position of a start point of the curve of the waveform shown in FIG. 5E is set to the position where the minimum time width (for example, Wt) of a beam spot and a movement distance of the beam due to the speed modulation are equal. Since the minimum time width of the beam spot is determined by the highest frequency of a signal which can be transmitted by the signal system, the position of the start point of the curve of the waveform can be determined.

In the embodiment of the invention, the speed modulation is performed on the basis of the correction amount similar to that of the speed modulation at the center of the screen until a point just before the overcorrection region in a manner such that the speed modulation can be performed by the enough correction amount even in a region near the peripheral portion of the screen and the image whose picture quality is improved in most of the region of the screen can be obtained.

Further, in the embodiment of the invention, the average luminance level is detected in the range of the overcorrection region and, when this level is higher than a certain predetermined value, the speed modulation correction amount is not attenuated but the correction amount is maintained to a fixed value up to the corner of the screen in a manner similar to the conventional apparatus. That is, although the speed modulation correction amount is set to a predetermined value and is not changed in a thin black line, the speed modulation correction amount is reduced along the deflecting sensitivity in case of a thin white line.

Figure 6:
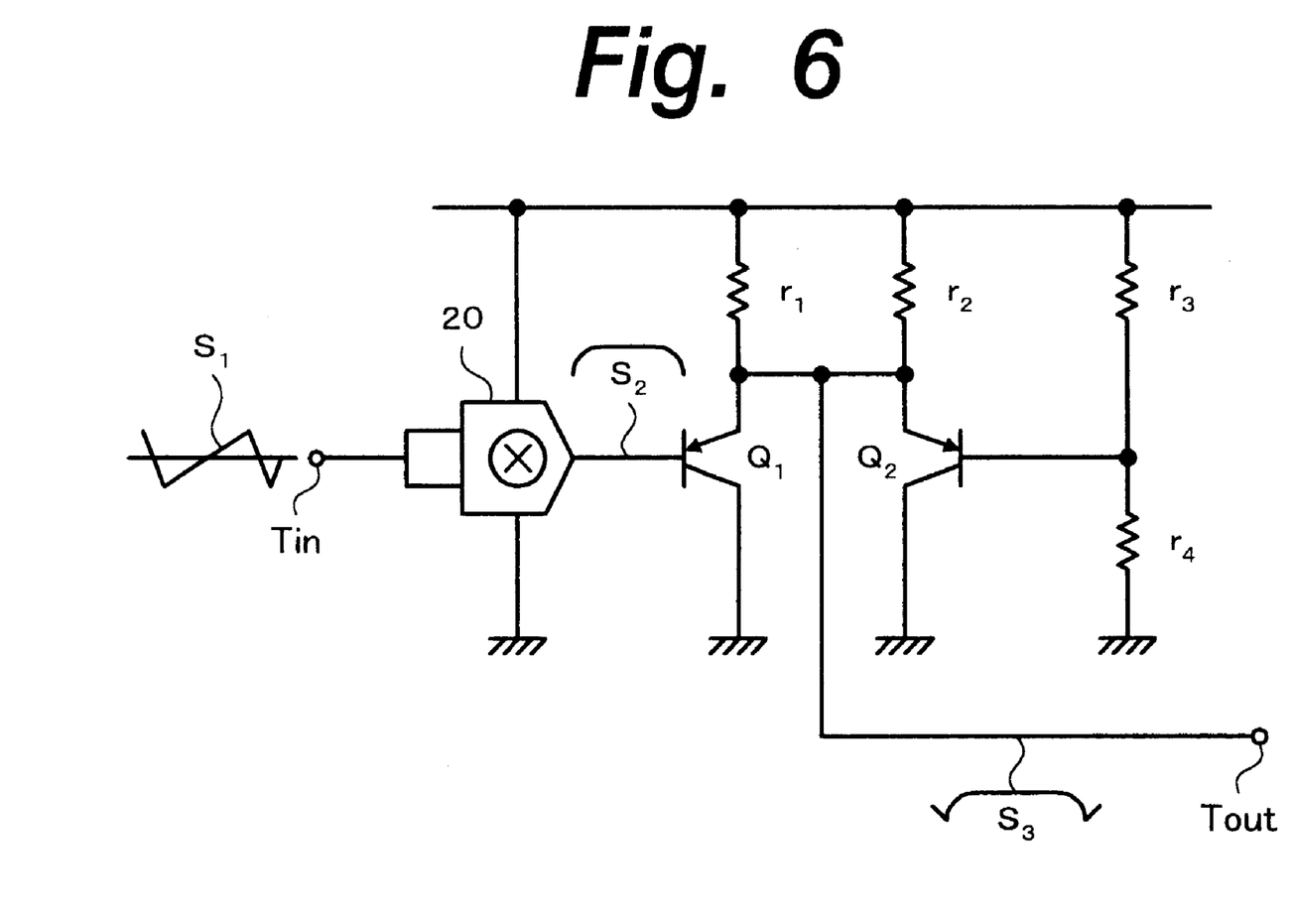
FIG. 6 is a circuit diagram showing an example of a reference signal generating circuit for generating a parabolic reference signal whose center portion has been deformed so as to become flat.

FIG. 6 shows an example of a reference signal generating circuit for generating a signal having a parabolic reference waveform whose center portion has been deformed so as to become flat as shown in FIG. 5E. The reference signal generating circuit can be constructed by a multiplier 20 and two transistors $Q_1$ and $Q_2$ constructing a limiter. Two inputs of the general-use multiplier 20 are connected in common and a scanning saw-tooth wave signal S1 of one horizontal period is supplied to an input terminal Tin. A waveform of the supplied signal S1 is converted to a parabolic waveform S2 so as to have an arbitrary shape (accurately, waveform that is analogous to the deflecting sensitivity curve of the CRT) by controlling a gain of the multiplier 20.

Further, the waveform S2 is received by the buffer transistor $Q_1$, a level of this signal is limited by the transistor $Q_2$ so as to become a fixed value up to the speed modulation overcorrection region, thereby obtaining an output signal S3. A limiting period of time is set to a period within a deflection angle of, for example, 60°.

Since the deflecting sensitivity curve in the overcorrection region differs depending on the kind of tube or the dimensions of the tube surface, it is necessary to decide it every TV set in accordance with the CRT. This circuit can be combined with a DSP (digital signal processor), a memory, and an A/D converter and can form a signal which is analogous to the deflection curve and has a fixed center value.

Figure 7A:
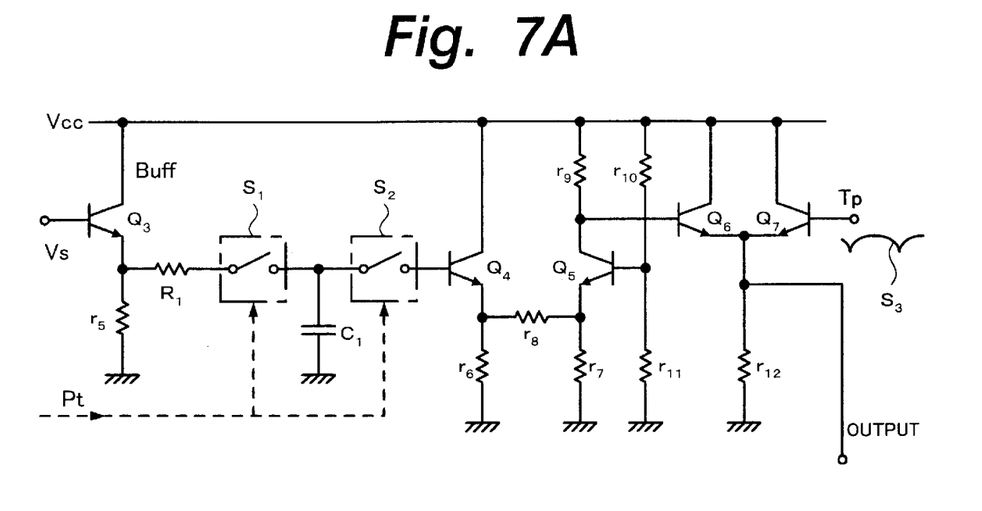
FIG. 7 is a circuit diagram for detecting an average luminance of right and left peripheral portions of a screen and a waveform diagram for explaining the operation of this circuit.

The average luminance sampling circuit to detect an average luminance of the peripheral portions of the screen will now be described with reference to a block diagram of FIG. 7A and a waveform diagram of FIG. 7B.

A video signal Vs in which a DC has been reproduced is inputted to a buffer transistor $Q_3$ and charges a capacitor C1 through a resistor R1 and a sampling switch S1. At this time, a low pass filter is constructed by the resistor R1 and capacitor C1. A secondary filter can be substituted for this filter. Frequency characteristics of the filter are determined by a cut-off frequency such that the level can be at tenuated by −3 dB or more at a frequency (period wt) of the vertical line in FIG. 5 where a blur appears in the thin white character due to the speed modulation overcorrection.

Figure 7B:
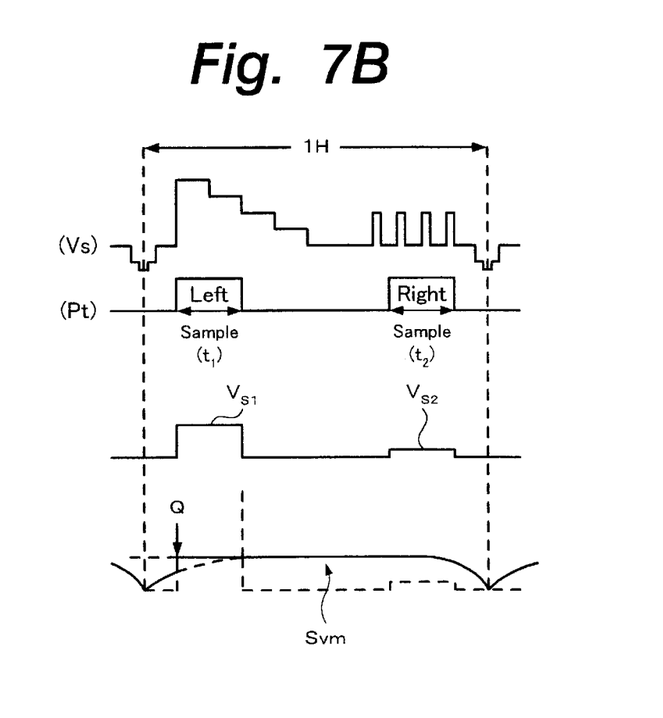

A sampling timing t1 in FIG. 7B occurs, for example, by inputting the saw-tooth wave mentioned above and a DC voltage which is turned on for the period of time of the speed modulation overcorrection region on the left side of the screen to a general-use comparator (not shown).

The sampling switch S1 is turned on/off by a timing pulse (Pt) and the average luminance value of the peripheral portion on the left side (Left) of the screen is sampled.

Also with respect to the right side (Right) of the screen, another circuit similar to that in FIG. 7 is provided and the average luminance can be sampled at sampling timing t2 (shown by "Right Sample").

Average luminance voltages VS1 and VS2 sampled on the left and right sides of the screen are supplied to a differential amplifier comprising transistors $Q_4$ and $Q_5$ through an analog switch S2 in order to extract them at the same timing. An output of the differential amplifier is supplied to transistors $Q_6$ and $Q_7$ constructing the next maximum value detecting circuit.

A parabolic reference waveform S3 is supplied to a base of the transistor $Q_7$. Levels of the sampled average luminance voltages VS1 and VS2 and the higher level of the parabolic reference signal are outputted as an output signal Svm in FIG. 7 from an emitter of the transistor $Q_7$.

The new reference waveform S3 generated as mentioned above and the average luminance voltage VS held in the filter and analog switch S2 are compared. An output voltage Svm which is derived as a result of the comparison is inputted to a control terminal of the variable gain amplifier 13, so that the speed modulation overcorrection occurring at a position near the periphery of the screen can be attenuated to a proper correction amount.

By the above operation, when the average luminance level of the speed modulation overcorrection region is high, namely, when the thin vertical line is a black line in a white background, the focusing deterioration in the peripheral portion of the screen is compensated in a manner similar to the conventional one, so that the strong speed modulation correction can be realized.

Figure 8:
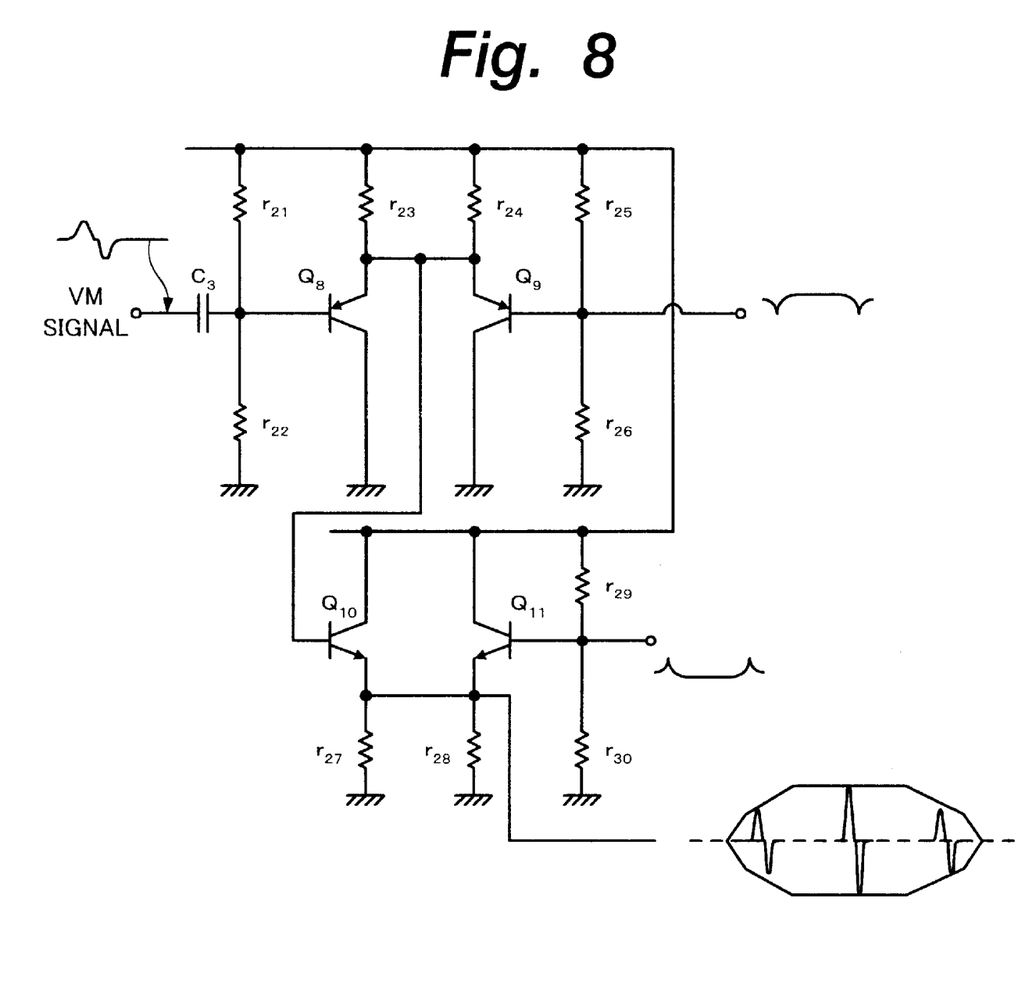
FIG. 8 is a circuit diagram showing an example of a circuit in case of constructing a variable gain amplifier by a limiter circuit.

FIG. 8 is a circuit for limiting a speed modulation overcorrection by a limiter circuit in place of attenuating the speed modulation correction amount by the variable gain amplifier.

A DC component of the speed modulation signal (primary differentiation signal of the luminance signal in FIG. 5B) is removed by a capacitor C3 and the resultant signal is inputted to an emitter follower comprising a PNP type transistor $Q_8$. At this time, a transistor $Q_9$ operates so as to limit the maximum voltage. That is, when the parabolic waveform in FIG. 5E is inputted to a base of the transistor $Q_9$ synchronously with a horizontal period, the signal on the positive side of the inputted speed modulation signal having a shape which is set to the fixed value in a range from the center of the waveform to the speed modulation overcorrection region and is analogous to the deflecting sensitivity in the speed modulation overcorrection region can be limited.

An output of this signal is further received by an emitter follower comprising an NPN type transistor $Q_{10}$. At this time, a transistor $Q_{11}$ operates so as to limit the minimum voltage. If the waveform in FIG. 5E is inverted by a general-use inverting amplifier and inputted to a base of the transistor $Q_{11}$, the level on the negative side of the inputted speed modulation signal can be limited.

If the parabolic reference signal which is applied to the bases of the transistors $Q_9$ and $Q_{11}$ has a waveform (output signal Svm in FIG. 7) such that the higher level is outputted according to the average luminance of the peripheral portions of the screen as described in FIG. 7, the modulation by the average luminance can be performed by using the limiter circuit as a variable gain amplifier 13 in FIG. 3.

As described above, the scanning speed modulating circuit of the television receiver of the invention has the following effects.

(1) Since the speed modulation correction amount is attenuated along the curve that is analogous to the deflecting sensitivity in the speed modulation overcorrection region, the blur of the thin white vertical line in the peripheral portion of the screen by the scanning speed modulation, particularly, the deterioration of the fine character can be prevented.

(2) By sampling the average luminance in the speed modulation overcorrection region, in the case where a thin black vertical line exists in the peripheral portion of the screen, by performing the speed modulation correction, the picture quality of the whole image can be improved.

(3) In the portion in a range from the center region of the screen to the speed modulation overcorrection region, the speed modulation correction amount is maintained in a manner similar to that at the center of the screen, so that the speed modulation can be performed by the enough correction amount even in the region near the speed modulation overcorrection region. The image whose picture quality is improved in most of the regions of the screen can be obtained.

And the like.

What is claimed is:

1. A scanning speed modulating circuit of an image display apparatus, in which by modulating a scanning speed of an electron beam of a cathode ray tube in accordance with a video signal that is supplied to said cathode ray tube, sharpness of an image which is displayed on said cathode ray tube is improved, comprising:

correction signal generating means for generating a speed modulating correction signal to modulate said scanning speed of said electron beam in accordance with said video signal;

correction signal control means for controlling a level of said speed modulating correction signal by a reference signal having a predetermined waveform that is changed synchronously with a scan of said electron beam;

reference signal generating means for generating said reference signal of a waveform such that it decreases along a curve that is analogous to a deflecting sensitivity of said cathode ray tube in a peripheral portion of a screen of said cathode ray tube;

detecting means for detecting a level according to an average luminance of said video signal in portions corresponding to at least right and left peripheral portions of said screen of said cathode ray tube; and maximum value detecting means for comparing said level detected by said detecting means with a level of said reference signal generated by said reference signal generating means and supplying one of said video signal and said reference signal having a higher level to said correction signal control means.

2. A circuit according to claim 1, wherein said correction signal generating means generates said reference signal of the waveform such that it decreases along a curve which is almost flat in a center portion of the screen of said cathode ray tube and whose both ends are analogous to said deflecting sensitivity.

3. A circuit according to claim 1, wherein said reference signal generating means includes:

a square circuit which inputs a saw-tooth wave signal synchronized with the scan of said electron beam; and a limiter for limiting a level of an output of said square circuit.

4. The circuit according to claim 3, wherein said circuit that receives a saw-tooth wave signal is constructed by a variable gain multiplying circuit whose two input terminals are connected in common.

5. A circuit according to claim 1, wherein said correction signal generating means generates said reference signal of a waveform such that it decreases along a curve which is almost flat in a center portion of the screen of said cathode ray tube and in which, in portions on the outside from almost 60° as a deflection angle of the cathode ray tube, both ends are analogous to said deflecting sensitivity.

\* \* \* \* \*